United States Patent
Anand et al.

(10) Patent No.: US 9,531,829 B1
(45) Date of Patent: Dec. 27, 2016

(54) SMART HIERARCHICAL CACHE USING HTML5 STORAGE APIS

(71) Applicant: Instart Logic, Inc., Mountain View, CA (US)

(72) Inventors: Ashok Anand, Bangalore (IN); Mohammad H. Reshadi, Sunnyvale, CA (US); Hariharan Kolam, Sunnyvale, CA (US); Bowei Du, Mountain View, CA (US); Aditya Akella, Madison, WI (US)

(73) Assignee: Instart Logic, Inc., Palo Alto, CA (US)

( * ) Notice: Subject to any disclaimer, the term of this patent is extended or adjusted under 35 U.S.C. 154(b) by 461 days.

(21) Appl. No.: 14/091,794

(22) Filed: Nov. 27, 2013

Related U.S. Application Data (60) Provisional application No. 61/898,766, filed on Nov. 1, 2013.

(51) Int. Cl.
*G06F 17/30* (2006.01)
*H04L 29/08* (2006.01)

(52) U.S. Cl.
CPC ................................. *H04L 67/2842* (2013.01)

(58) Field of Classification Search
None
See application file for complete search history.

(56) References Cited

U.S. PATENT DOCUMENTS

| | | | | |
|---|---|---|---|---|
| 5,023,776 A * | 6/1991 | Gregor | ................ | G06F 12/0897 711/118 |
| 6,192,398 B1 * | 2/2001 | Hunt | ................ | G06F 17/30902 707/999.01 |
| 6,338,117 B1 * | 1/2002 | Challenger | ........... | G06F 12/121 711/122 |
| 7,240,100 B1 * | 7/2007 | Wein | .................... | H04L 67/1008 709/214 |
| 8,913,072 B2 * | 12/2014 | Li | ............................ | G09G 5/00 345/557 |
| 2002/0116582 A1 * | 8/2002 | Copeland | .......... | G06F 17/30902 711/133 |
| 2002/0144065 A1 * | 10/2002 | Mills | ..................... | G06F 15/167 711/147 |
| 2003/0187814 A1 * | 10/2003 | Patel | ..................... | G06F 9/3826 |
| 2004/0010499 A1 * | 1/2004 | Ghosh | ............... | G06F 17/30368 |
| 2006/0143256 A1 * | 6/2006 | Galchev | ................ | G06F 12/084 |
| 2006/0195677 A1 * | 8/2006 | Tan | ..................... | G06F 12/0846 711/205 |

(Continued)

OTHER PUBLICATIONS

Gravelle, Rob. Building a Client Side AJAX Cache. 2009. <https://web.archive.org/web/20090209155730/http://www.webreference.com/programming/javascript/rg26/index.html>.*

*Primary Examiner* — Syed Hasan
(74) *Attorney, Agent, or Firm* — Van Pelt, Yi & James LLP (57) ABSTRACT

A method of caching resources corresponding to a webpage on a client is disclosed. A hierarchy of a plurality of storage mechanisms available on the client is determined based at least in part on performance of the plurality of storage mechanisms. The hierarchy comprises a plurality of levels to which each storage mechanism may be assigned. A request to cache a first resource corresponding to a webpage is received. One of the plurality of storage mechanisms for caching the first resource is selected based at least in part on the hierarchy. The first resource is stored in the selected storage mechanism of the hierarchy.

29 Claims, 10 Drawing Sheets

(56) References Cited

U.S. PATENT DOCUMENTS

| | | | |
|---|---|---|---|
| 2008/0228772 A1* | 9/2008 | Plamondon | G06F 17/30902 |
| 2009/0019158 A1* | 1/2009 | Langen | H04L 67/1095 709/226 |
| 2009/0240698 A1* | 9/2009 | Shukla | G06F 17/30286 |
| 2009/0240935 A1* | 9/2009 | Shukla | G06F 9/44505 713/100 |
| 2010/0262647 A1* | 10/2010 | Malek | H04L 67/02 709/203 |
| 2013/0185475 A1* | 7/2013 | Talagala | G06F 12/0866 711/102 |
| 2015/0039713 A1* | 2/2015 | Martini | H04L 67/2852 709/213 |

* cited by examiner

```
get(key, cb) {
    for (backend in cache hierarchy)
*       if (key in backend)
            obj = backend.get(key) or {}
*       if (isValid(key, obj))
            cb(obj)
    onMiss(key, obj)
}
```

FIG. 4

```
put(key, value, ?metadata) {
* obj = metadata? metadata : onGetMetadata(key)
  obj.value = value
  for (backend in getHierarchy(obj))
*   while (! backend.put(key, obj))
*     if (! backend.evict(obj.priority))
        break; // Go to slower storage type
}
```

FIG. 5

```
// We replace the code for loading into
// the property:
img.src = "img.jpg"
// with the hcache call:
hcache.get("img.jpg", function(obj) {
// .value representation of the image
img.src = obj.value; })
```

FIG. 6

SMART HIERARCHICAL CACHE USING HTML5 STORAGE APIS

CROSS REFERENCE TO OTHER APPLICATIONS

This application claims priority to U.S. Provisional Patent Application No. 61/898,766 entitled HCACHE: A SMART HIERARCHICAL CACHE USING HTML5 STORAGE APIS filed Nov. 1, 2013 which is incorporated herein by reference for all purposes.

BACKGROUND OF THE INVENTION

Typically, a web browser needs to receive dependent resources associated with different links and URLs (Uniform Resource Locators) before it can complete the rendering of a webpage. Efficient delivery of these dependent resources can significantly improve the end-user experience. Therefore, improved techniques for delivering different types of resources corresponding to a webpage would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When a web browser starts loading an HTML (HyperText Markup Language) webpage, the web browser parses the webpage and discovers dependent resources (e.g., JavaScript files, images, videos, audio clips, and CSS (Cascading Style Sheets) files) that need to be separately downloaded and processed. For each resource, the web browser contacts a server, downloads the content over the network, and processes it locally on the client side.

Typically, a user may visit the same webpage at different times, or visit a sequence of pages that share one or more resources. A caching mechanism can temporarily store some of these resources and reduce the bandwidth usage, server load, and user perceived delay. The cache may be located anywhere between the origin server and the target client. For example, a cache on the web server can reduce the computation overhead for generating the same webpage for multiple users. A cache on a Content Delivery Network (CDN) node can cache the resources as close as possible to the users and thus reduces the origin server load as well as the round trip delay for receiving each resource on the client. A client-side cache (e.g., a browser cache) can store a resource on the client and avoid downloading the resource if the resource is still valid.

However, client-side caching using a browser cache has a number of drawbacks. A browser cache was designed to optimize network bandwidth rather than latency. Bandwidth optimization is suitable for fairly static webpages, because the goal is to show all of the content of a webpage as soon as possible. However, as the amount of content in webpages increases and as interactivity becomes more important in modern web applications, latency optimization becomes more important.

The cache performance for some types of resources may impact the overall performance more than for other types of resources, and thus the cache performance for some resources might be more important than for others. For example, their respective importance may depend on the composition of the webpages. However, existing browser caches may offer suboptimal performance and no application control. In addition, existing cache control mechanisms offer little to no flexibility in cache usage.

Browser caches are not the most efficient storage mechanisms to handle certain workloads on certain user clients (e.g., browsers and devices). When handling different workloads on different user clients, various alternative storage mechanisms, e.g., localStorage, sessionStorage, and indexDB available in HTML5, have wide ranges of storage access time and performance. Some of the alternative storage mechanisms (e.g., localStorage and sessionStorage) can be shown to be consistently and significantly (one to two orders of magnitude) faster than browser caches. In addition, unlike the browser cache, which is shared across domains, some of the storage mechanisms are per-domain, thus improving both the performance and security of the web applications. Accordingly, a hierarchical client-side cache (referred to as the HCache) can be used to leverage the different alternative storage mechanisms as backends to replace or augment the browser caches in a hierarchical fashion, such that the webpage load latency can be reduced significantly. In some embodiments, the HCache can be accessed via a set of APIs (Application Programming Interfaces). The APIs allow web application developers to intelligently control how the alternative storage mechanisms are used.

Current browser and browser cache implementations also have many limitations that impact the cache hit ratio for critical resources. Cache hit ratio is affected by the eviction policy. After downloading a particular resource, the web browser needs to decide whether to cache the resource or not, and whether some other resources need to be evicted from the cache. In current cache implementations, the browser and the server negotiate caching capability and content validity without providing any control to the applications, and yet the impact of resource caching on the user experience is dependent on how the application uses the resource. In addition, the applications have no control over the cache load/store and network requests. Therefore, the applications cannot guide the browser cache behavior in order to reduce latency and improve user experience. Cache hits are also reduced when the browser cache is shared across domains, especially when some applications store undue amounts of data. The HCache provides the applications the necessary control over the cache behavior in order to reduce application load latency, including enabling the applications to make tailored choices about the importance of resources, e.g., those retrieved from third-party servers relative to application-owned resources, in relation to page load performance.

The HCache determines the performance of different storage mechanisms. In some embodiments, the performance results are used to determine how the alternative storage mechanisms are utilized to replace or augment the browser caches under different conditions, including the types of storage mechanisms used for storing different types of resource, the order/hierarchy in which the different types of storage mechanisms are filled given the type of browser and the type of device that the browser is running on, and the like.

As an illustrative example, the performance of the storage mechanisms available in HTML5 are determined below. However, the performance of other storage mechanisms may be determined, and other embodiments for determining the performance data may be used as well.

Table 1 illustrates the attributes of a plurality of HTML5 storage mechanisms for storing data on the client. Unlike the browser cache, which is shared across domains, the alternative storage mechanisms in Table 1 are separated from each other based on the domain name of the web application. In other words, the alternative storage mechanisms in Table 1 are private storages that are not shared between different web applications. Therefore, the web application need not handle the side effects of other applications on these storages.

TABLE 1

| Type | Capacity | Persistence | Access | Support | Storage Model | API |
| --- | --- | --- | --- | --- | --- | --- |
| LocalStorage | 5 MB | Yes | Synchronous | Most | String key/value | Full hash table |
| SessionStorage | 5 MB | Per-session | Synchronous | Most | String key/value | Full hash table |
| IndexDB | — | Yes | Asynchronous | Most | NoSQL database | Object lookup |
| FileSystem | — | Yes | Asynchronous | Chrome | file | File/directory IO |
| Browser Cache | — | Non-deterministic | Asynchronous | All | Implementation dependent | None |

With reference to Table 1, localStorage has a size limit of 5 megabytes per domain. It stores the data with no expiration date—the data will not be deleted when the browser is closed. The APIs of localStorage are synchronous; thus, the calling thread for retrieving and returning the data is blocked in the browser until the data is ready. The data is stored in key/value pairs. SessionStorage is identical to localStorage, except that it stores the data for only one browsing session, i.e., when an user opens a website and visits one or more pages in that website. The data is deleted when the user closes the browser window.

Unlike localStorage and sessionStorage, indexDB, fileSystem, and browser cache do not have a size limit of 5 megabytes per domain. The symbol "-" in the capacity column of Table 1 denotes that the capacity depends on the device capacity. The APIs for indexDB, fileSystem, and browser cache are asynchronous: the calling thread for retrieving and returning the data is not blocked in the browser until the data is ready; instead, a callback function is called when the data is ready.

The storage mechanisms in Table 1 are supported by most web browsers, including Chrome, Firefox, and Safari. Currently, fileSystem storage is only supported by Chrome.

As compared to the alternative storage mechanisms in Table 1, the browser cache is not the most reliable storage for web applications. The browser cache is a transparent storage that may be used when a resource is requested via an URL. The persistence of the data is non-deterministic and depends on the user activity and the amount of cachable content that other web sites and web applications may download.

With the exception of the browser cache, all of the alternative storage mechanisms in Table 1 offer full control over the content of the storage, including support for operations such as adding, removing, enumerating, and the like.

In some embodiments, the performance of various storage mechanisms is determined by measuring the load/store time for different object sizes on different browsers, devices, and operating systems (OSs). Table 2 illustrates a plurality of combinations of browsers, devices, and operating systems that can be used for determining the performance of the various storage mechanisms.

TABLE 2

| Browser | Device | Version | Operating System (OS) |
| --- | --- | --- | --- |
| Chrome (PC) | Lenovo T430 | 29.0 | Ubuntu-12.0.4 |
| Firefox (PC) | Lenovo T430 | 24.0 | Ubuntu-12.0.4 |
| Chrome (Mobile) | Galaxy S4 | 25.0 | Android 4.2.2 |
| Safari (Mobile) | iPhone 4 | 8 | iOS-6 |

As described above, the APIs for indexDB, fileSystem, and browser cache are asynchronous. Since the implementation of asynchronous API calls may pipeline the operations for better performance, the performance of the storage mechanisms is measured when 1) the APIs are called asynchronously and 2) when the API calls are serialized. In the asynchronous case, when the load/store operation is issued, the callback function is received independently. In the serialized case, each load/store operation is serialized after the callback function of the previous load/store operation is received. In both cases (i.e., the asynchronous case and the serialized case), a timer is started when the load/store request is issued, and the time elapsed since the last callback function is called is measured. In the asynchronous case, the requests are issued together and the callbacks may be called at any time afterwards. In the serialized case, the requests and callbacks are interleaved.

The performance of the browser cache may be measured using two different approaches. The performance is evaluated indirectly because the browser cache does not offer any direct API calls (see Table 1). In the first approach, an XMLHttpRequest (XHR) object is used to repeatedly fetch a cacheable object of a given size. After the object has been fetched once, subsequent requests will obtain the object from the browser cache. In the second approach, image objects (IMGs) are used to download images. The image requests are sent to the browser cache first and, upon a cache miss, the requests are sent out to the network. The source attribute of an image object is set to an URL. Identical to the first approach, after an image object has been fetched once, subsequent requests will obtain the image object from the browser cache.

The performance of each of the storage mechanisms in Table 1 may be measured by loading a test webpage. The test webpage includes a simple JavaScript program that first fetches N objects (e.g., N=100) of the same size and stores them using a given HTML5 storage. The JavaScript program then loads the objects back. Both the load and the store time are measured using different combinations of browsers, devices, and operating systems as shown in Table 2. The object sizes may range from 100 bytes to 1 megabytes.

Figure 1A:
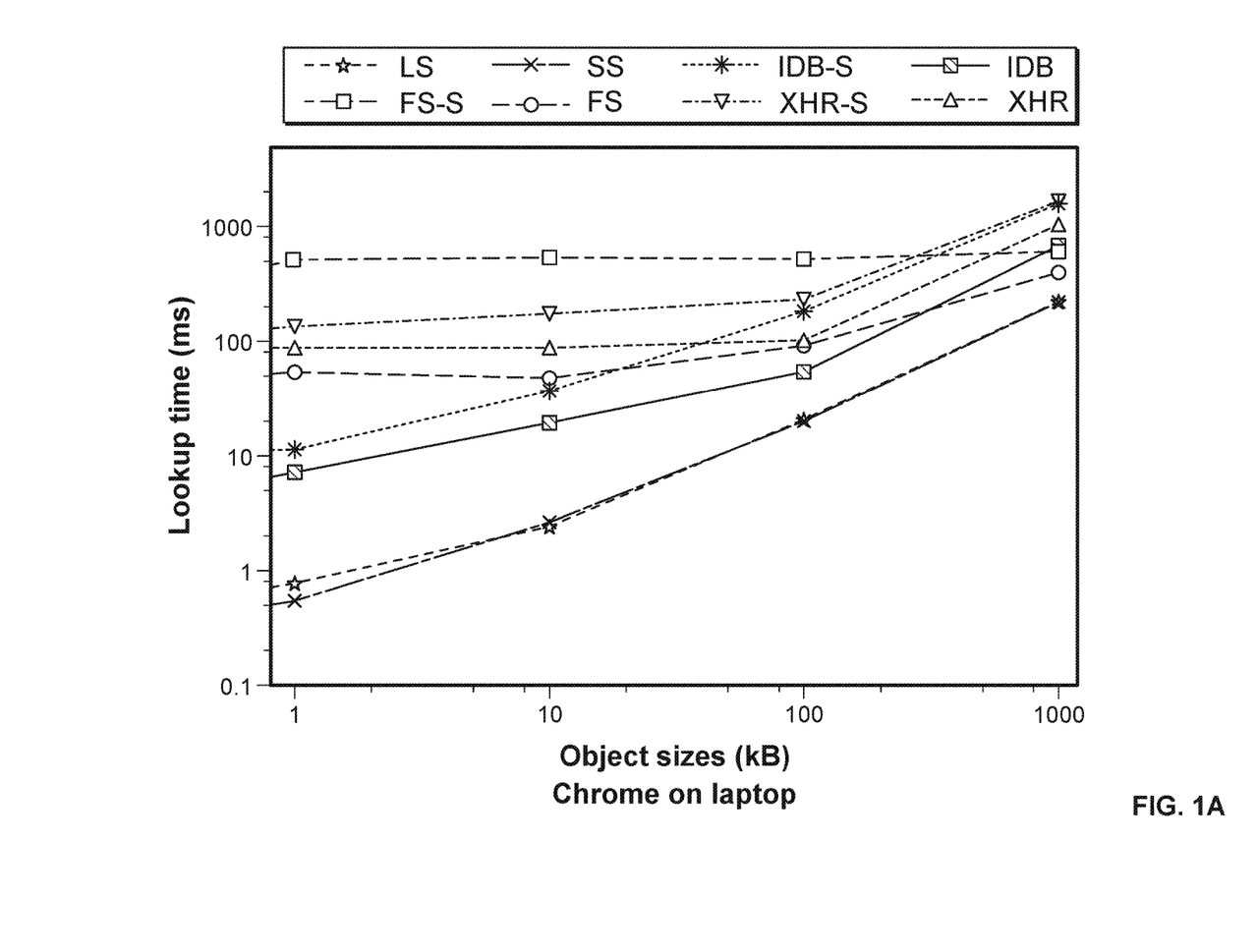
FIG. 1A illustrates the lookup performance variation with object size for various storage mechanisms using a Chrome browser on a laptop computer.
Figure 1B:
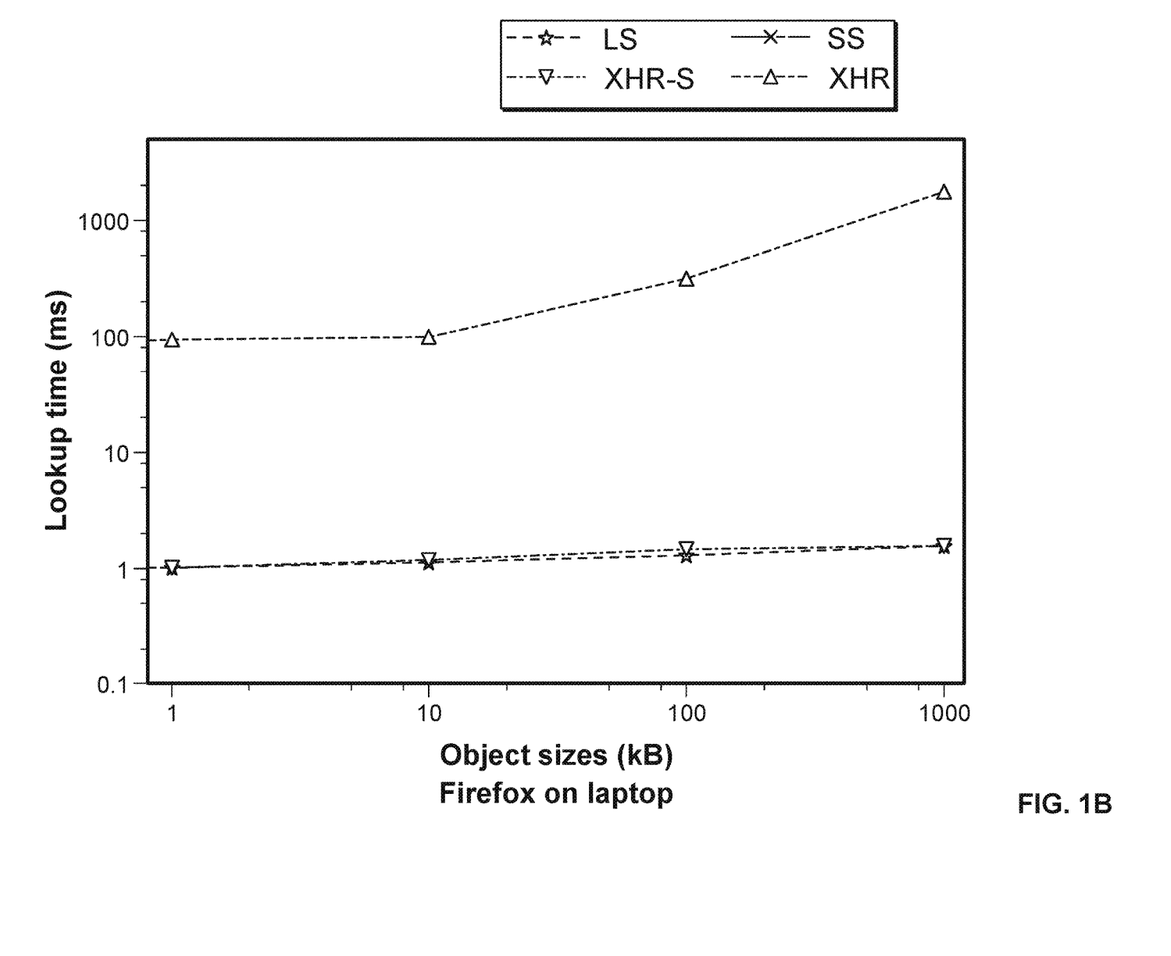
FIG. 1B illustrates the lookup performance variation with object size for various storage mechanisms using a Firefox browser on a laptop computer.
Figure 1C:
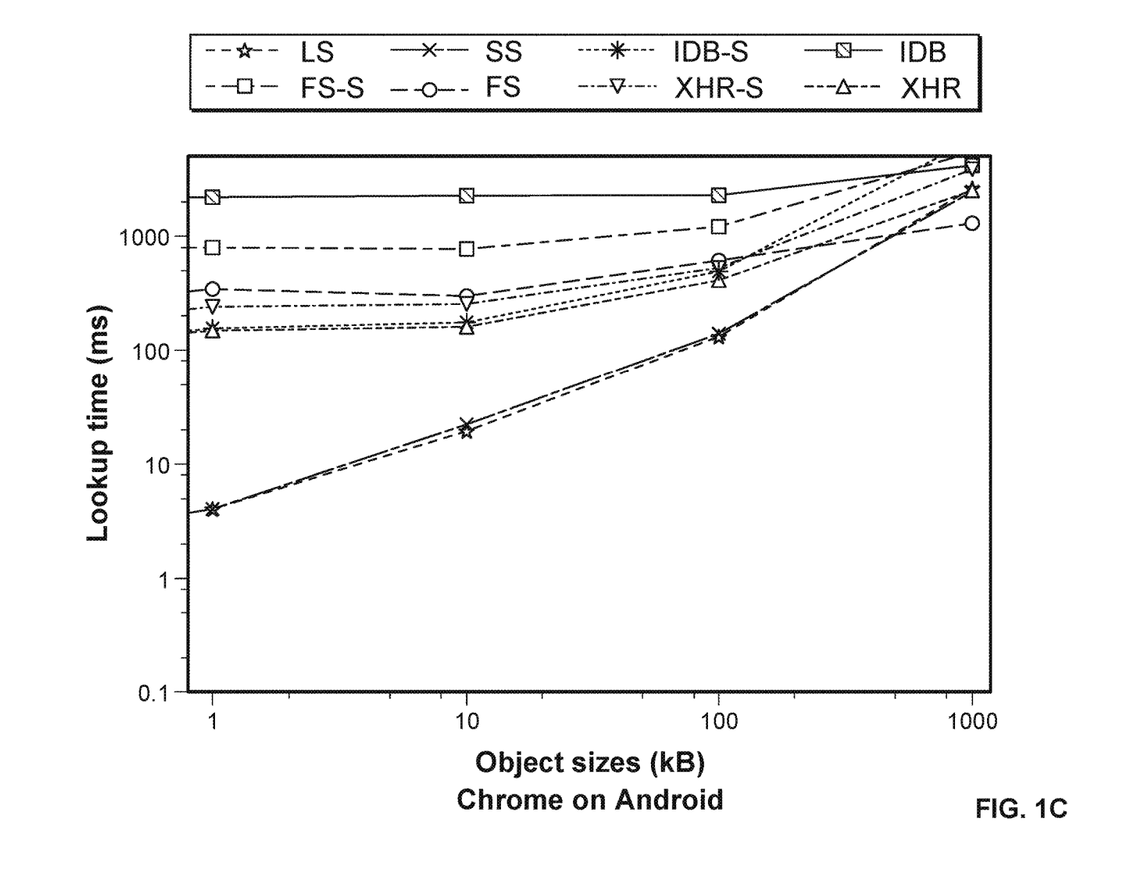
FIG. 1C illustrates the lookup performance variation with object size for various storage mechanisms using a Chrome browser on an Android smartphone.
Figure 1D:
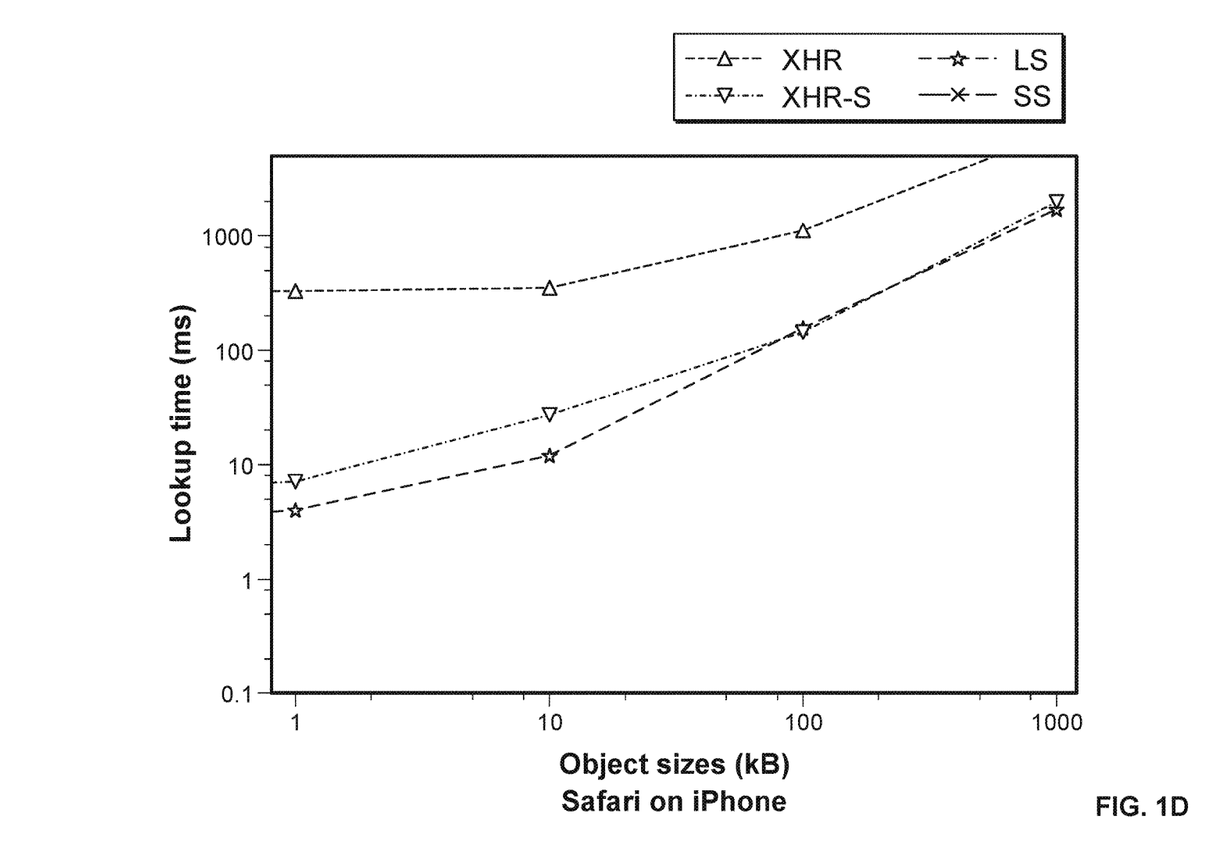
FIG. 1D illustrates the lookup performance variation with object size for various storage mechanisms using a Safari browser on an iPhone.

FIGS. 1A-1D illustrate the lookup/load operation performance variation with object size for various storage mechanisms on various platforms. In the figures, LS denotes localStorage, SS denotes sessionStorage, IDB denotes indexDB, IDB-S denotes indexDB APIs that are serialized, FS denotes fileSystem, FS-S denotes fileSystem APIs that are serialized, XHR denotes browser cache using XHR, and XHR-S denotes browser cache using XHR and with the APIs serialized. FIG. 1A illustrates the lookup performance variation with object size for various storage mechanisms using a Chrome browser on a laptop computer. FIG. 1B illustrates the lookup performance variation with object size for various storage mechanisms using a Firefox browser on a laptop computer. FIG. 1C illustrates the lookup performance variation with object size for various storage mechanisms using a Chrome browser on an Android smartphone. FIG. 1D illustrates the lookup performance variation with object size for various storage mechanisms using a Safari browser on an iPhone. The lookup time shown in the figures is the total time taken for N lookups, where N=100.

Figure 2A:
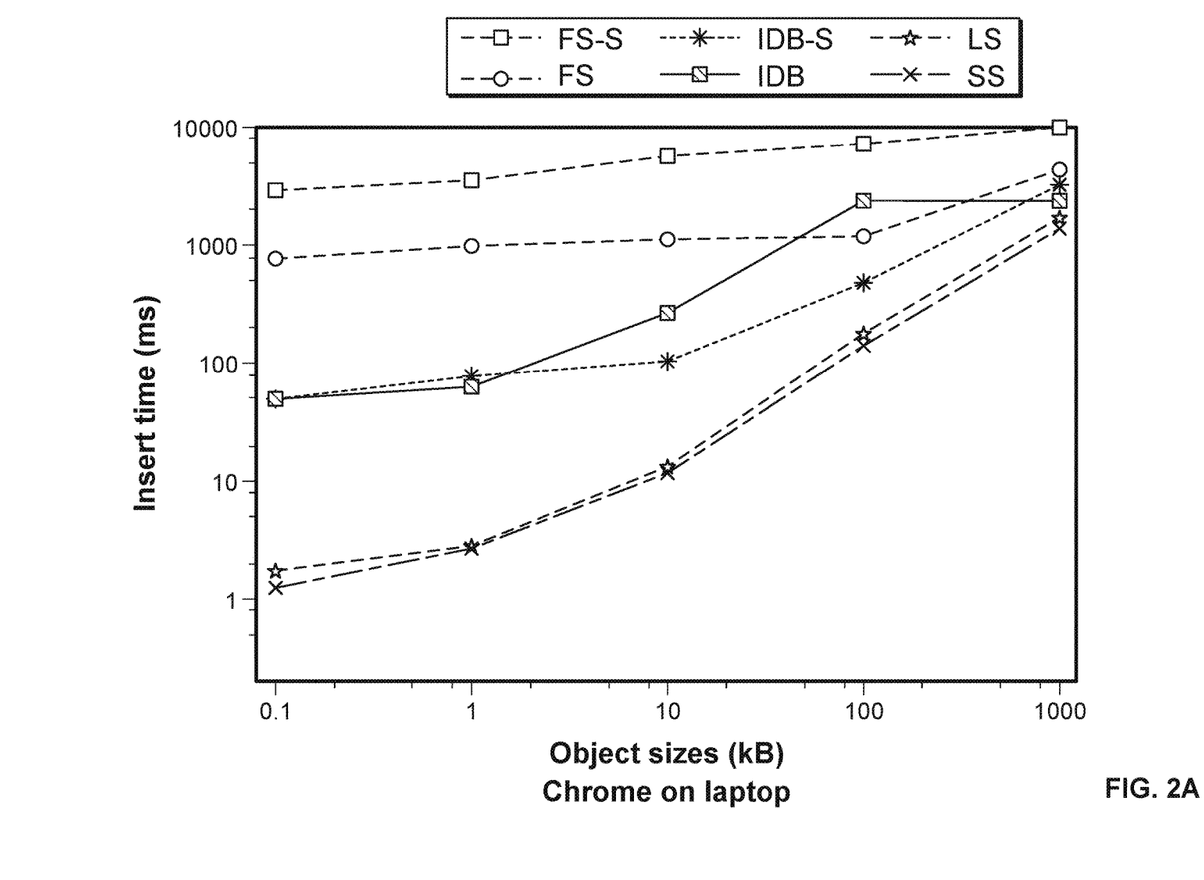
FIG. 2A illustrates the insertion performance variation with object size for various storage mechanisms using a Chrome browser on a laptop computer.
Figure 2B:
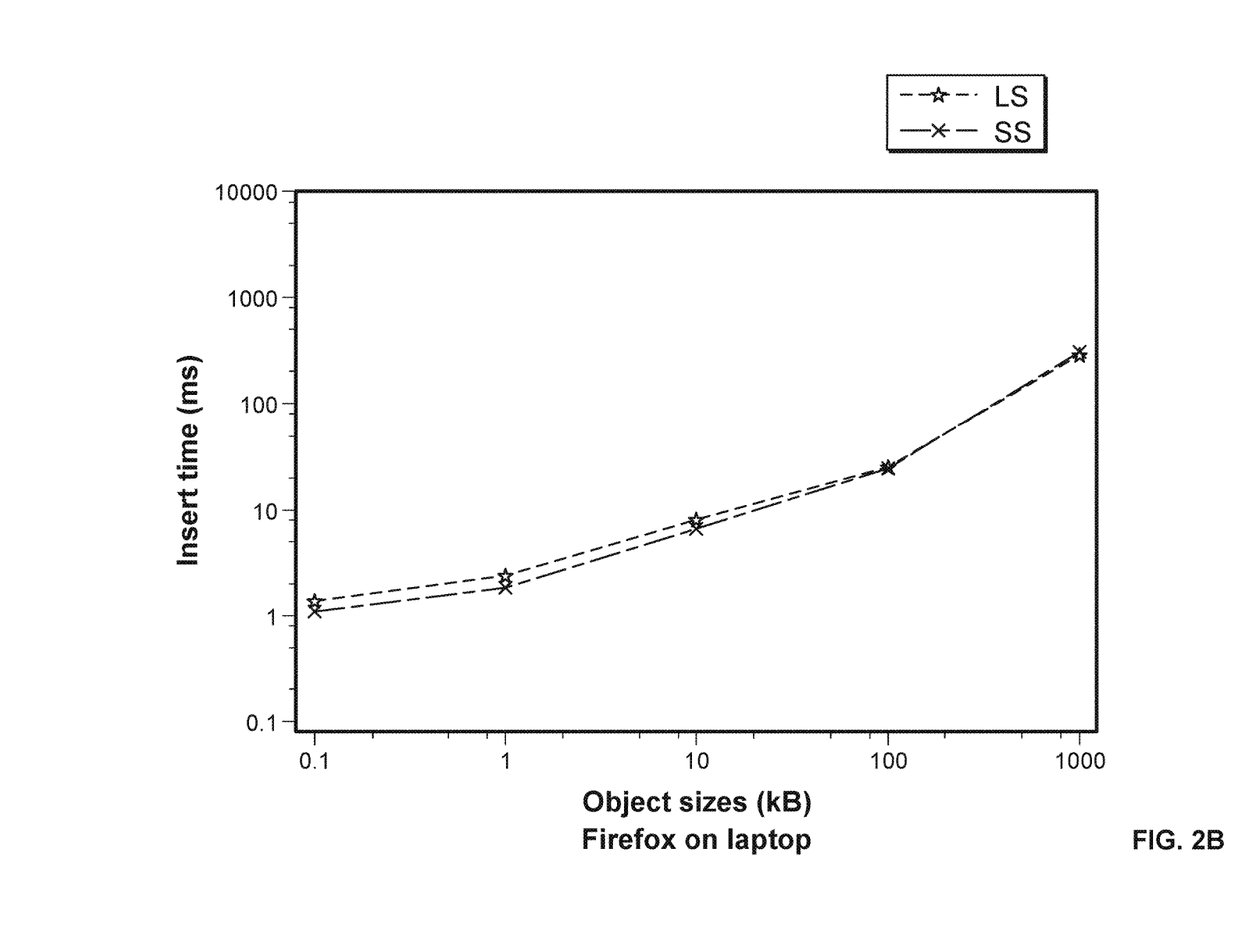
FIG. 2B illustrates the insertion performance variation with object size for various storage mechanisms using a Firefox browser on a laptop computer.
Figure 2C:
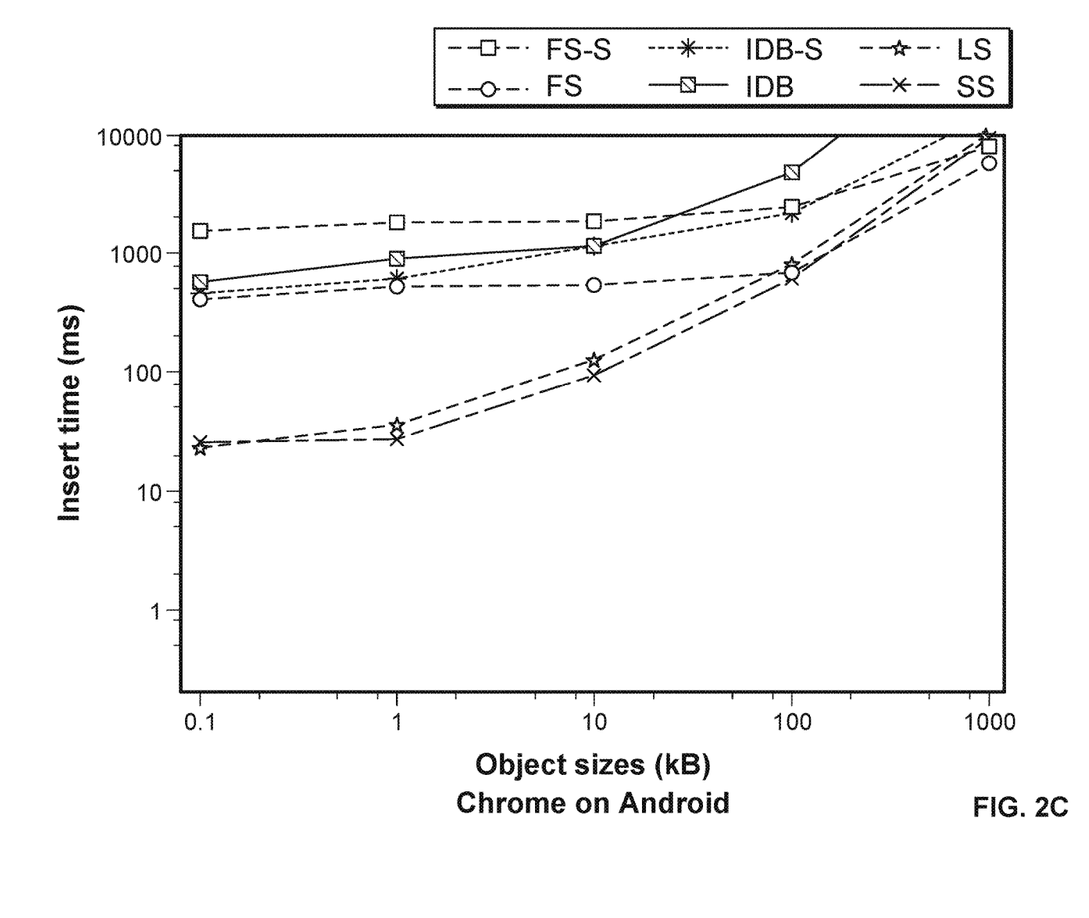
FIG. 2C illustrates the insertion performance variation with object size for various storage mechanisms using a Chrome browser on an Android smartphone.
Figure 2D:
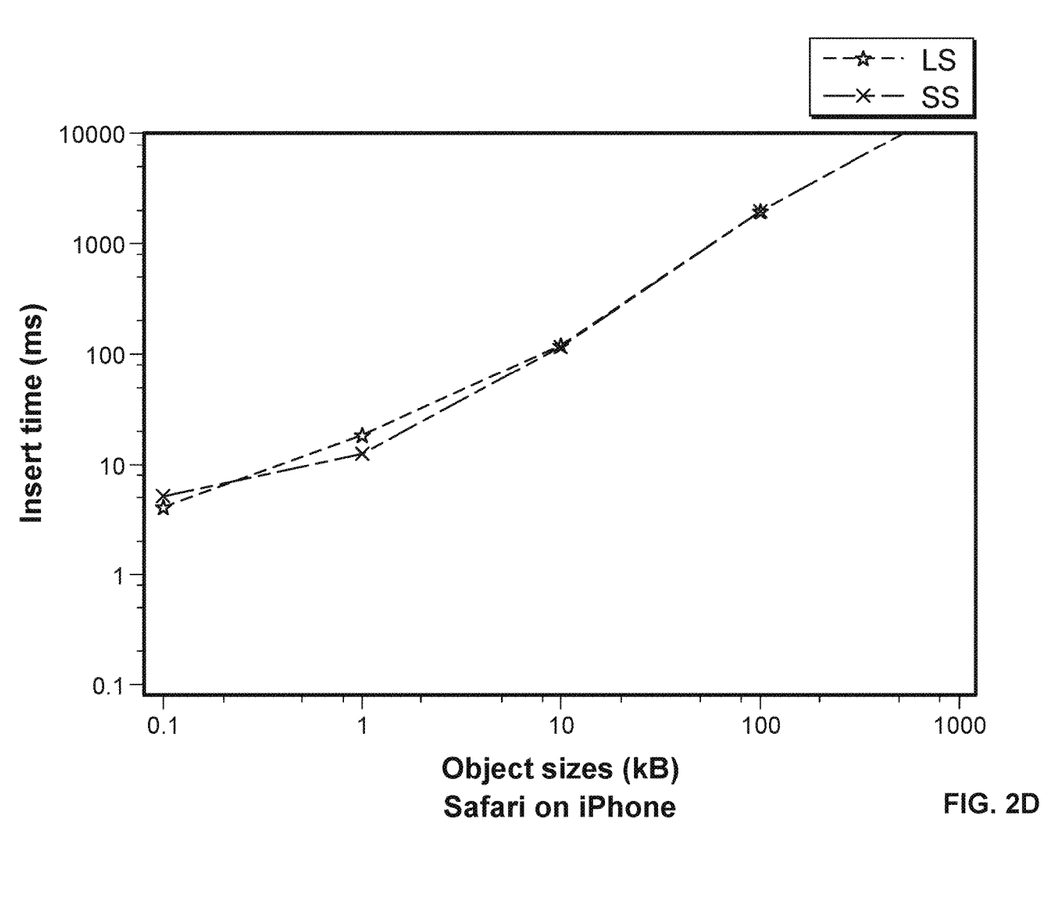
FIG. 2D illustrates the insertion performance variation with object size for various storage mechanisms using a Safari browser on an iPhone.

FIG. 2A-2D illustrate the insertion/store operation performance variation with object size for various storage mechanisms on various platforms. FIG. 2A illustrates the insertion performance variation with object size for various storage mechanisms using a Chrome browser on a laptop computer. FIG. 2B illustrates the insertion performance variation with object size for various storage mechanisms using a Firefox browser on a laptop computer. FIG. 2C illustrates the insertion performance variation with object size for various storage mechanisms using a Chrome browser on an Android smartphone. FIG. 2D illustrates the insertion performance variation with object size for various storage mechanisms using a Safari browser on an iPhone. The insertion time shown in the figures is the total time taken for N insertions, where N=100.

With reference to FIGS. 1A-1D and 2A-2D, localStorage and sessionStorage perform significantly (e.g., 10-100 orders of magnitude) better than other storage mechanisms on all devices and platforms, even though the performance gap for the storage mechanisms narrows for larger objects. In addition, the asynchronous versions of the APIs perform better than their serialized versions. IndexDB performs two times better than XHR using Chrome on an Android smartphone. However, the two perform similarly using Chrome on a laptop computer. FileSystem performs worse than other storage mechanisms, but it is likely to outperform network access in most cases. As shown in the above figures, the performance of different storage mechanisms may vary over time as the web browsers, the devices, and the operating systems continue to evolve and as new platforms become available. Accordingly, the HCache may continuously determine the performance of different storage mechanisms on different platforms and under different conditions such that the HCache can leverage the various storage mechanisms more effectively.

Figure 3:
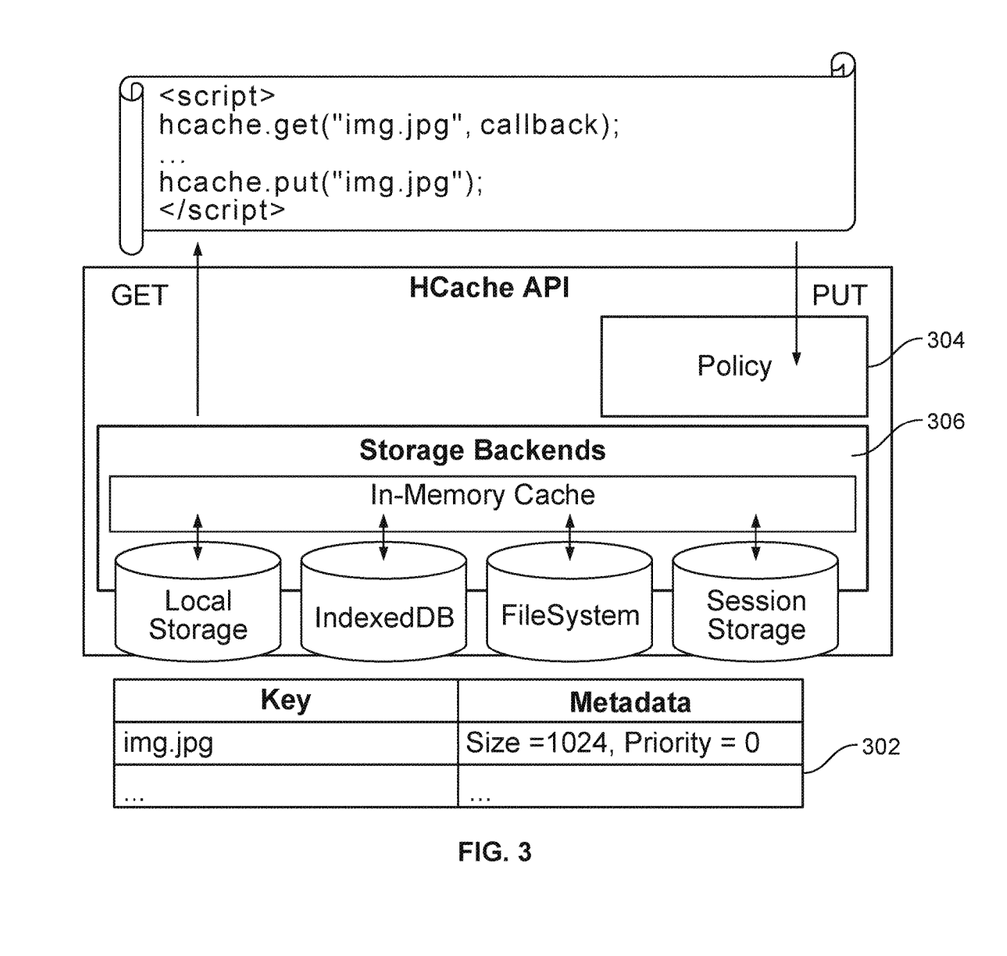
FIG. 3 illustrates an embodiment of a hierarchical client-side cache (HCache).

FIG. 3 illustrates an embodiment of a hierarchical client-side cache (HCache). The HCache provides a cache interface between the web browser and the various storage mechanisms on the client. A web application loads and stores objects via the HCache instead of directly interfacing with the browser cache. The HCache transparently manages which storage mechanism is used for caching resources, including loading/storing the resources from/to the selected storage mechanism. The HCache includes a policy module for application specific optimizations. In selecting a particular storage mechanism for caching a piece of resource, the HCache takes into account application-specific information, the performance differences and capacity limitations of the various storage mechanisms, and the like.

In some embodiments, the HCache is implemented as a JavaScript object, and the HCache JavaScript object is instantiated at the beginning of a webpage load. The instantiation of the HCache includes determining the types of storage mechanisms available. The instantiation further includes using the performance and capacity information of different storage mechanisms to determine how the storage mechanisms are utilized to replace or augment the browser caches under different conditions, including the types of storage mechanisms used for storing different types of resource, the order/hierarchy in which the different types of storage mechanisms are filled given the type of browser and the type of device that the browser is running on, and the like.

For example, the performance data as shown in FIG. 1A may be used to determine the cache hierarchy when the platform is a Chrome browser running on a laptop computer as follows. For object sizes less than 100 kB, the cache hierarchy (from highest priority/most preferred to lowest priority/least preferred) may be set as localStorage, sessionStorage, indexDB, and fileSystem. For object sizes of ~1000 kB, fileSystem performs better than indexDB. Thus, the hierarchy may be set as localStorage, sessionStorage, fileSystem, and indexDB.

In another example, the performance data as shown in FIG. 1C may be used to determine the cache hierarchy when the platform is a Chrome browser running on an Android smartphone. Since fileSystem performs better than indexDB for all object sizes, the cache hierarchy (from highest priority/most preferred to lowest priority/least preferred) may be set as localStorage, sessionStorage, fileSystem, and indexDB.

As shown in FIG. 3, the HCache includes a number of modules. Module 302 is a module for storing the cached resources and their corresponding metadata. This module maps opaque keys to JavaScript objects for storing the cached value. Each of the cached object is associated with a corresponding set of metadata for managing cache expiry, validation, and eviction. Module 304 is a policy module for determining the storage hierarchy and object eviction policies. Module 306 is a storage backends module. This module encapsulates the different types of storage mechanisms available to a web application, and handles the serialization and deserialization of the cached value into a format that is suitable for a given storage mechanism. The module further includes an in-memory cache above the storage backends. The in-memory cache is used to store cached values that are most frequently used.

A cached resource is stored as an object in the HCache. Each object is a tuple of metadata with a value. The metadata includes three sets of properties. One set of properties includes application-dependent properties such as the priority, which is used by the eviction algorithm to determine which object to evict when the storage backends are full. Another set of properties includes content dependent properties, such as the size of the object (e.g., in bytes) and MIME types (internet media types). Another set of properties includes server dependent properties, such as expiry and validity. The expiry and validity fields may be used to implement HTTP (Hypertext Transfer Protocol) expiry and revalidation semantics.

The HCache includes a number of APIs. Table 3 illustrates three APIs provided by the HCache. The new( ) API instantiates and initiates the HCache. The get( ) API is used to load objects from the cache. The put( ) API is used to store objects into the cache. The put( ) API may also evict objects from a storage mechanism when the capacity of that storage mechanism has reached its limit. In some embodiments, the put( ) operations may be queued until the webpage is loaded (i.e., after the window.onload event has fired). Both the get( ) and the put( ) APIs may be implemented as asynchronous JavaScript functions, such that the result of each operation is passed to a callback rather than being returned at function exit.

TABLE 3

| API method | Function | Other description |
| --- | --- | --- |
| hcache = new (?onGetMetadata, ?onMiss) | Construct an HCache | 1. onGetMetadata is a callback of type object onGetMetadata(key) 2. onMiss is a callback of type void (key, ?obj). It is called when the object must be retrieved from the browser cache |
| void hcache.get (key, cb) | Asynchronously retrieve the object corresponding to the key. | cb is a callback of type void cb(obj) that is invoked when the get operation has completed |
| void hache.put (key, value, ?metadata) | Asynchronously store key, value pair into the cache. | Metadata is an optional parameter containing extra information that can be used by the application developer to control how the object is placed in the cache hierarchy |

Figure 4:
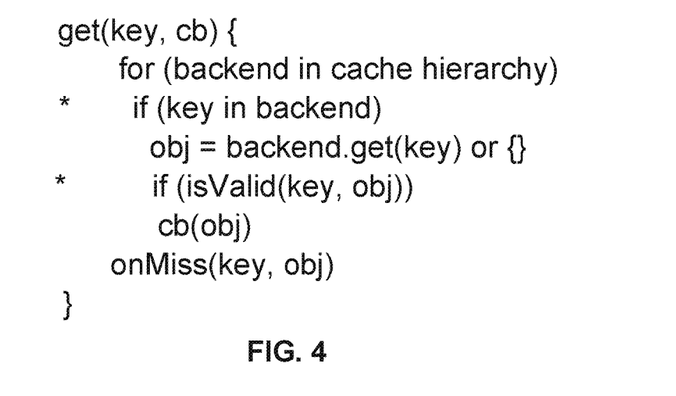
FIG. 4 illustrates an embodiment of the pseudocode for a get( ) API.

FIG. 4 illustrates an embodiment of the pseudocode for a get( ) API. A cached object is searched by iteratively walking through the different levels of the cache hierarchy (i.e., the hierarchy of storage mechanisms). If the cached object is found, the validity of the cached object is determined. For example, the function isValid( ) may be used. The validity is determined according to HTTP caching semantics using the expires timestamp and the validity portions of the object's metadata. If the cached object is expired, the cached copy is re-validated by sending an XHR HEAD request using the original object URL. If a valid object cannot be found in any of the storage mechanisms, the onMiss callback handler configured in the HCache is invoked to retrieve the object from the browser cache. In some embodiments, the onMiss callback uses an XHR or a special browser object (e.g., an image) to request and retrieve an object from the browser cache. If the object is not found in the browser cache, then it will be fetched from the network, and after the object is fetched from the network, the browser may decide to cache it in the browser cache. In some embodiments, the onMiss callback may be customized (e.g., by the application developer) to use specific loading mechanisms. Note that for ease of presentation, FIG. 4 illustrates the pseudocode for a synchronous implementation of backend storage mechanisms. The portions of the pseudocode indicated with a "*" may be modified for an asynchronous implementation of the backend storage mechanism.

Figure 5:
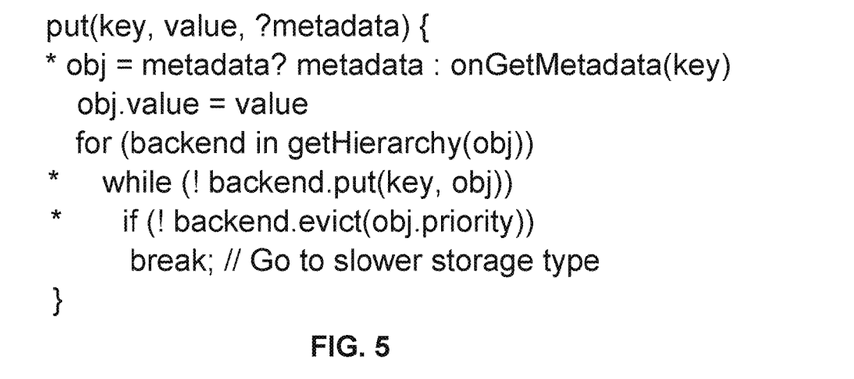
FIG. 5 illustrates an embodiment of the pseudocode for a put( ) API.

FIG. 5 illustrates an embodiment of the pseudocode for a put( ) API. Objects are stored into the HCache explicitly via the put( ) API call. In some embodiments, the put( ) operations are queued and delayed until the performance-critical portion of the load operation has been completed. In some embodiments, the onload browser event is used to trigger the delayed processing of the queued put( ) operations. The objects of each storage mechanisms in the hierarchy are organized into a set of cascading heaps sorted by the numerical priority (higher being more preferred) returned by the onGetMetadata callback. Eviction from the HCache occurs when an object with a higher numerical priority evicts an object with a lower numerical priority from a higher level to a lower level of the hierarchy. Evictions cascade through the hierarchy such that the highest priority objects stay in the cache hierarchy. In some embodiments, the priority of the stored objects may be set to its last access time to simulate the LRU (Least Recently Used) cache algorithm.

The HCache can be used directly by a web developer of a web application. The HCache can be used to load resources explicitly and asynchronously. The HCache can also be used to load images dynamically.

The HCache may be used to load resources explicitly and asynchronously. For example, the HCache APIs may be used to replace the functionalities related to a XHR request. XMLHttpRequest (XHR) is an API available to web browser scripting languages such as JavaScript. It is used to send HTTP or HTTPS (Hypertext Transfer Procotol Secure) requests to a web server and asynchronously load the server response data back into the script. In one example, a web developer may continue to use most of the methods of the XHR request, but replace the methods of the window.XMLHttpRequest object with a set of methods that first call the HCache get( ) API. If the requested resource is not stored in the HCache, the get( ) API may sequentially pass the request onto the browser cache/network stack. If an object is fetched from the browser cache or through the network, the callback response may be intercepted by the HCache such that the fetched object may be stored into the HCache via the put( ) API. The intercepted response may also be used to set the expiry information included in the metadata associated with the cached object. For example, XHRresponseHeader( ) may be used to retrieve the "Cache-Control" and "Expires" headers from the response and they can be used to set the metadata of the cached object.

Figure 6:
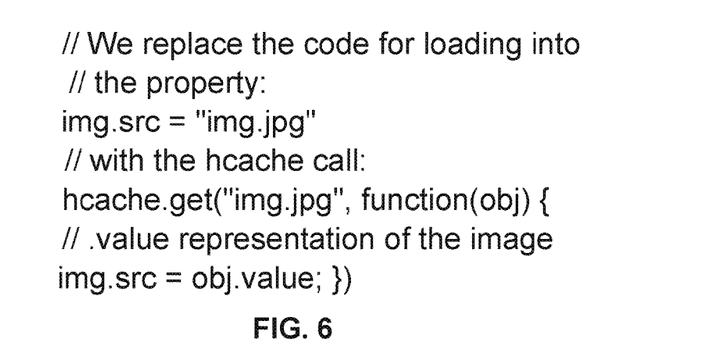
FIG. 6 illustrates an embodiment of a piece of JavaScript code that has been modified to use the HCache to load images dynamically.

The HCache can also be used to load images dynamically. FIG. 6 illustrates an embodiment of a piece of JavaScript code that has been modified to use the HCache to load images dynamically. In the absence of the HCache, when the DOM (Document Object Model) property is set (img.src="img.jpg"), the web browser schedules a network request for the image resource and the image resource is fetched asynchronously in the background. With the HCache employed, the code "img.src="img.jpg" is commented out and replaced by calling the HCache get( ) API. As shown in FIG. 6, a small stub function is used to set the appropriate DOM element when the object is loaded by the HCache.

The HCache can also be used by a proxy server (e.g., an Instart edge server) that serves webpages and other resources to a web browser. The proxy server injects code (also referred to as a nanovisor) that virtualizes the Document Object Model (DOM) tree. DOM is a standardized model supported by different web browsers, e.g., Internet Explorer, Firefox, and Google Chrome, to represent the various components of a webpage. The DOM is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs). Because the DOM objects are virtualized, access to the objects may be intercepted by the nanovisor, which in turn may access the objects via HCache.

The HCache may also include configurable parameters and policy. For example, these configurable parameters and policy may be specified by the developer.

The in-memory cache may be specified as a storage for certain cached objects. The in-memory cache is used to store cached values that are most frequently used. Therefore, if a webpage refers to certain objects multiple times, the developer may specify that these objects be written to in-memory cache only.

In some embodiments, the put( ) operations are queued and delayed until the performance-critical portion of the load operation has been completed (i.e., after the window.onload event has fired). The order in which the queued objects are stored into the HCache may be determined by a policy (e.g., based on the size of the objects) configured by the developer. In one example, the policy specifies that the objects are written to the HCache in the order that they are loaded in the webpage. In another example, the policy specifies that the objects are sorted by size in descending order and that higher priority is given to larger objects: the rationale is that larger objects may impact the onload time more, thus fast loading of these objects can lead to improvement in onload time. By specifying higher priority for larger objects, the HCache stores the larger objects using faster storage mechanisms. In another example, the policy specifies that the objects are sorted by size in ascending order and that higher priority is given to smaller objects. In this instance, the rationale is that smaller objects are likely to be present across related webpages, and that by ensuring that these objects get served from HCache, the developer can optimize across multiple webpages.

In some embodiments, the loading priority assigned to different objects is configurable. When a webpage is visited again, the objects are loaded from the HCache. By assigning appropriate priority values to various objects, the developers can control the order in which objects are loaded.

In some embodiments, the HCache is configurable to store multiple versions of a cached object, and the different versions of the cached object may be loaded at different times. For example, before the onload event, the HCache can be used to load lower resolution images for faster loading, while after the onload event is fired, high resolution images can be loaded.

In some embodiments, the HCache further includes enhanced cache control mechanisms that improve the performance of HTTP liveness determination. A cached HTTP object can be in one of two liveness states: fresh or stale. A fresh object can be used immediately without contacting the remote server. A stale object requires a revalidation round-trip before the object can be used. The stale object latency penalty can be further compounded by dependencies between objects, e.g., objects that are dynamically loaded via JavaScript. The HCache may provide prefetch revalidation, lazy revalidation, and aggregate revalidation.

In prefetch revalidation, upon the initial load of the webpage, the server may send validation information for objects that are likely to be in the client HCache. This technique can reduce the number of subsequent revalidation messages.

In lazy revalidation, the HCache shifts the liveness determination from the critical path to the background, i.e., objects in the HCache are not validated during webpage load. Instead, objects in the HCache (that are not yet stale) can be revalidated after the initial load of the objects without impacting the performance of the page. Further, these objects can be revalidated only when they are close to expiry deadline.

In aggregate revalidation, revalidation request messages for objects stored in the HCache are batched together and sent as a single message to the server, thus saving round-trip time between the client and the server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of caching resources corresponding to a webpage on a client, comprising:
   determining by a processor a hierarchy of a plurality of storage mechanisms available on the client based at least in part on performance of the plurality of storage mechanisms, the hierarchy comprising a plurality of levels to which each storage mechanism may be assigned;
   receiving a request to cache a first resource corresponding to a webpage;
   selecting one of the plurality of storage mechanisms for caching the first resource based at least in part on the hierarchy;
   storing the first resource in the selected storage mechanism of the hierarchy;
   receiving a request to retrieve a second resource; and
   retrieving the second resource from the hierarchy of the plurality of storage mechanisms, wherein retrieving the second resource comprises searching for the second resource by iteratively walking through at least some of the plurality of levels of the hierarchy, wherein in the event that the second resource is not found by iteratively walking through at least some of the plurality of levels of the hierarchy, the second resource is retrieved from the browser cache, and the second resource retrieved from the browser cache is stored in the hierarchy of the plurality of storage mechanisms.

2. The method of claim 1, wherein storing the first resource comprises:
   queuing the storing of the first resource in a queue and delaying the storing of the first resource in the selected storage mechanism until a later time.

3. The method of claim 2, wherein an order in which resources in the queue are stored in the hierarchy is based on a configurable policy.

4. The method of claim 1, wherein storing the first resource comprises:
   determining another stored resource in the hierarchy needs to be evicted from the hierarchy based on a priority associated with the first resource;
   evicting the determined another stored resource from the hierarchy; and
   storing the first resource in the hierarchy.

5. The method of claim 1, wherein the performance comprises performance corresponding to time required to load resources of different sizes to a particular storage mechanism.

6. The method of claim 1, wherein the performance comprises performance corresponding to time required to store resources of different sizes to a particular storage mechanism.

7. The method of claim 1, wherein the performance comprises performance corresponding to a plurality of platforms, the platform comprising a particular type of browser, device, and operating system.

8. The method of claim 1, wherein selecting one of the plurality of storage mechanisms for caching the first resource comprises selecting further based at least in part on capacities of the plurality of storage mechanisms.

9. The method of claim 1, wherein selecting one of the plurality of storage mechanisms for caching the first resource comprises selecting further based at least in part on application-specific information of an application associated with the webpage.

10. The method of claim 1, wherein the plurality of storage mechanisms comprises one of more of the following HTML5 storage mechanisms: localStorage, sessionStorage, indexDB, and fileSystem.

11. The method of claim 1, further comprising instantiating a JavaScript object comprising the hierarchy in response to a loading of the webpage.

12. The method of claim 1, where the hierarchy further comprises an in-memory cache, the method further comprises determining whether the first resource is stored in the in-memory cache based at least in part on frequency of use of the first resource.

13. The method of claim 1, wherein storing the first resource comprises storing the first resource and metadata associated with the first resource, the metadata comprising information corresponding to expiry and revalidation of the first resource.

14. A system for caching resources corresponding to a webpage on a client, comprising:
   a processor configured to:
      determine a hierarchy of a plurality of storage mechanisms available on the client based at least in part on performance of the plurality of storage mechanisms, the hierarchy comprising a plurality of levels to which each storage mechanism may be assigned;
      receive a request to cache a first resource corresponding to a webpage;
      select one of the plurality of storage mechanisms for caching the first resource based at least in part on the hierarchy;
      store the first resource in the selected storage mechanism of the hierarchy;
      receive a request to retrieve a second resource; and
      retrieve the second resource from the hierarchy of the plurality of storage mechanisms, wherein retrieving the second resource comprises searching for the second resource by iteratively walking through at least some of the plurality of levels of the hierarchy, wherein in the event that the second resource is not found by iteratively walking through at least some of the plurality of levels of the hierarchy, the second resource is retrieved from the browser cache, and the second resource retrieved from the browser cache is stored in the hierarchy of the plurality of storage mechanisms; and
   a memory coupled to the processor and configured to provide the processor with instructions.

15. The system of claim 14, wherein storing the first resource comprises:
   queuing the storing of the first resource in a queue and delaying the storing of the first resource in the selected storage mechanism until a later time.

16. The system of claim 15, wherein an order in which resources in the queue are stored in the hierarchy is based on a configurable policy.

17. The system of claim 16, wherein the order comprises one of the following:

sorted by size in ascending order, sorted by size in descending order, and sorted based on contribution to visual completeness.

18. The system of claim 14, wherein storing the first resource comprises:
  determining another stored resource in the hierarchy needs to be evicted from the hierarchy based on a priority associated with the first resource;
  evicting the determined another stored resource from the hierarchy; and
  storing the first resource in the hierarchy.

19. The system of claim 14, wherein the performance comprises the performance corresponding to time required to load resources of different sizes to a particular storage mechanism.

20. The system of claim 14, wherein the performance comprises the performance corresponding to time required to store resources of different sizes to a particular storage mechanism.

21. The system of claim 14, wherein the performance comprises the performance corresponding to a plurality of platforms, the platform comprising a particular type of browser, device, and operating system.

22. The system of claim 14, wherein selecting one of the plurality of storage mechanisms for caching the first resource comprises selecting further based at least in part on capacities of the plurality of storage mechanisms.

23. The system of claim 14, wherein selecting one of the plurality of storage mechanisms for caching the first resource comprises selecting further based at least in part on application-specific information of an application associated with the webpage.

24. The system of claim 14, wherein the plurality of storage mechanisms comprises one of more of the following HTML5 storage mechanisms: localStorage, sessionStorage, indexDB, and fileSystem.

25. The system of claim 14, wherein the memory is further configured to provide the processor with instructions which when executed cause the processor to instantiate a JavaScript object comprising the hierarchy in response to loading of the webpage.

26. The system of claim 14, where the hierarchy further comprises an in-memory cache, wherein the memory is further configured to provide the processor with instructions which when executed cause the processor to determine whether the first resource is stored in the in-memory cache based at least in part on frequency of use of the first resource.

27. The system of claim 14, wherein storing the first resource comprises storing the first resource and metadata associated with the first resource, the metadata comprising information corresponding to expiry and revalidation of the first resource.

28. The system of claim 14, wherein the memory is further configured to provide the processor with instructions which when executed cause the processor to:
  delay a validation of the first resource until loading of the webpage is completed.

29. A computer program product for caching resources corresponding to a webpage on a client, the computer program product being embodied in a non-transitory computer readable storage medium and comprising computer instructions for:
  determining by a processor a hierarchy of a plurality of storage mechanisms available on the client based at least in part on performance of the plurality of storage mechanisms, the hierarchy comprising a plurality of levels to which each storage mechanism may be assigned;
  receiving a request to cache a first resource corresponding to a webpage;
  selecting one of the plurality of storage mechanisms for caching the first resource based at least in part on the hierarchy;
  storing the first resource in the selected storage mechanism of the hierarchy;
  receiving a request to retrieve a second resource; and
  retrieving the second resource from the hierarchy of the plurality of storage mechanisms, wherein retrieving the second resource comprises searching for the second resource by iteratively walking through at least some of the plurality of levels of the hierarchy, wherein in the event that the second resource is not found by iteratively walking through at least some of the plurality of levels of the hierarchy, the second resource is retrieved from the browser cache, and the second resource retrieved from the browser cache is stored in the hierarchy of the plurality of storage mechanisms.

* * * * *